United States Patent
Pervaiz

(10) Patent No.: US 7,163,194 B2
(45) Date of Patent: Jan. 16, 2007

(54) ACTUATOR FOR ROTOR VALVE

(75) Inventor: Muhammad Pervaiz, Erie, PA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/285,846

(22) Filed: Nov. 22, 2005

(65) Prior Publication Data

US 2006/0102865 A1    May 18, 2006

Related U.S. Application Data

(62) Division of application No. 10/742,473, filed on Dec. 19, 2003, now Pat. No. 6,994,316.

(60) Provisional application No. 60/440,446, filed on Jan. 16, 2003.

(51) Int. Cl.
*F16K 51/00* (2006.01)

(52) U.S. Cl. .......................... 251/288; 251/63.4; 251/14; 251/58; 251/250

(58) Field of Classification Search .............. 251/288
See application file for complete search history.

(56) References Cited

U.S. PATENT DOCUMENTS

| 2,371,657 | A | 3/1945 | Stark |
| 3,218,026 | A | 11/1965 | Roy, Sr. |
| 4,165,763 | A | 8/1979 | Hough |
| 4,338,857 | A | 7/1982 | Mason |
| 4,414,109 | A | 11/1983 | Aurthur |
| 4,548,385 | A | 10/1985 | Barbuto |
| 4,564,169 | A * | 1/1986 | Nordlund ............ 251/58 |
| 4,949,936 | A * | 8/1990 | Messina ............. 251/58 |
| 5,154,147 | A | 10/1992 | Muroki |
| 5,372,104 | A | 12/1994 | Griffin |
| 5,413,256 | A | 5/1995 | Mitchell et al. |
| 5,415,147 | A | 5/1995 | Nagle et al. |
| 5,556,271 | A * | 9/1996 | Zuercher et al. ......... 418/201.2 |
| 5,941,206 | A | 8/1999 | Smith et al. |
| 6,076,799 | A | 6/2000 | Baumann |
| 6,085,788 | A | 7/2000 | Larson et al. |
| 6,098,576 | A | 8/2000 | Nowak, Jr. et al. |
| 6,196,167 | B1 | 3/2001 | Marsh et al. |
| 6,230,668 | B1 | 5/2001 | Marsh et al. |
| 6,308,739 | B1 | 10/2001 | Barbuto et al. |

(Continued)

*Primary Examiner*—J. Casimer Jacyna
(74) *Attorney, Agent, or Firm*—Carlos Luis Hanze; Beusse Wolter Sanks Mora & Maire, P.A.; David G. Maire

(57) ABSTRACT

An actuator (16) for a rotor valve (10). The actuator includes a rack (86) for driving a pinion gear (87) of the valve. The rack is moved between first and second positions by the action of a first piston (88). Movement of the first piston and rack is selectively restricted in one direction by the movement of a moveable stop (104) from a withdrawn position to an extended position, thereby defining a third position of the rack. The moveable stop may be driven by a second piston (102). The first and second pistons may be powered by a common compressed air supply (122). The cross-sectional area of the first piston may be at least 1.4 times the cross-sectional area of the second piston to ensure that the force exerted by the first piston is not sufficient to displace the moveable stop from the extended position when the second piston is open to the compressed air supply.

9 Claims, 9 Drawing Sheets

U.S. PATENT DOCUMENTS 6,345,805 B1 2/2002 Chatufale
6,371,439 B1 * 4/2002 Trevisan ..................... 251/58
6,647,934 B1 11/2003 Marsh

* cited by examiner

ACTUATOR FOR ROTOR VALVE

This application is a divisional application of U.S. application Ser. No. 10/742,473 filed Dec. 19, 2003 now U.S. Pat. No. 6,994,316, which in turn claims benefit of the Jan. 16, 2003, filing date of U.S. provisional application No. 60/440,446.

FIELD OF THE INVENTION

This invention relates generally to the field of valves and more particularly to an actuator for a rotary (or rotor) valve.

BACKGROUND OF THE INVENTION

Rotor valves are known for use in applications where a source of fluid must be selectively directed to one of several destinations. Such valves have a rotor that can be rotated about its longitudinal axis in a bore of the valve body. When the rotor is rotated to a closed position, the rotor blocks a fluid flow through the valve. A known challenge with this type of valve is how to establish an effective fluid seal between the mating surfaces of the rotor and the valve body while at the same time avoiding excessive operating torque.

U.S. Pat. No. 6,308,739 describes a rotor valve that utilizes a flexible valve seal. This valve is described as being useful for applications such as air conditioning/heating units wherein the heating and cooling flows of the heat pump need to be reversed from time to time. Such applications require the valve to direct fluid from the valve interior to the proper valve body outlet opening, and further to prevent fluid from exiting any other valve body outlet opening. The seal for such a valve may be called an interior pressure seal.

The assignee of the present invention, General Electric Company, produces railway locomotives and off-road vehicles powered by turbocharged diesel engines that utilize a split temperature cooling system, as described in U.S. Pat. Nos. 5,415,147 and 6,230,668, both incorporated by reference herein. The cooling system includes an intercooler that is provided with either hot water or cold water for selectively heating or cooling the combustion intake air during the various modes of operation of the locomotive. A rotor valve used in such applications must not only prevent fluid from exiting the valve body through a closed outlet opening (interior pressure), but in certain operating modes, it must also prevent pressurized fluid from entering the valve body through a closed outlet opening (exterior pressure). One such valve is described in U.S. Pat. No. 6,647,934 that is incorporated by reference herein. The valve seal described in U.S. Pat. No. 6,308,739 has been found to be inadequate for the turbocharged diesel engine cooling system application.

DETAILED DESCRIPTION OF THE INVENTION

Figure 1:
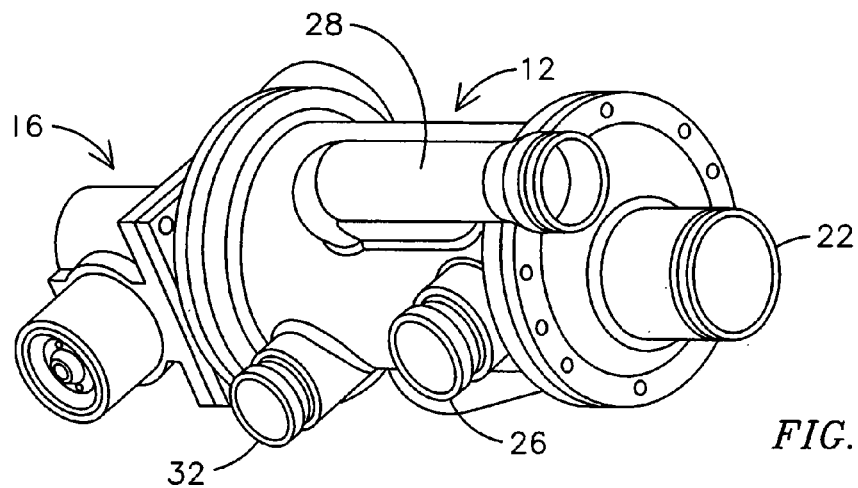
FIG. 1 is a perspective view of a ganged rotor valve.
Figure 2:
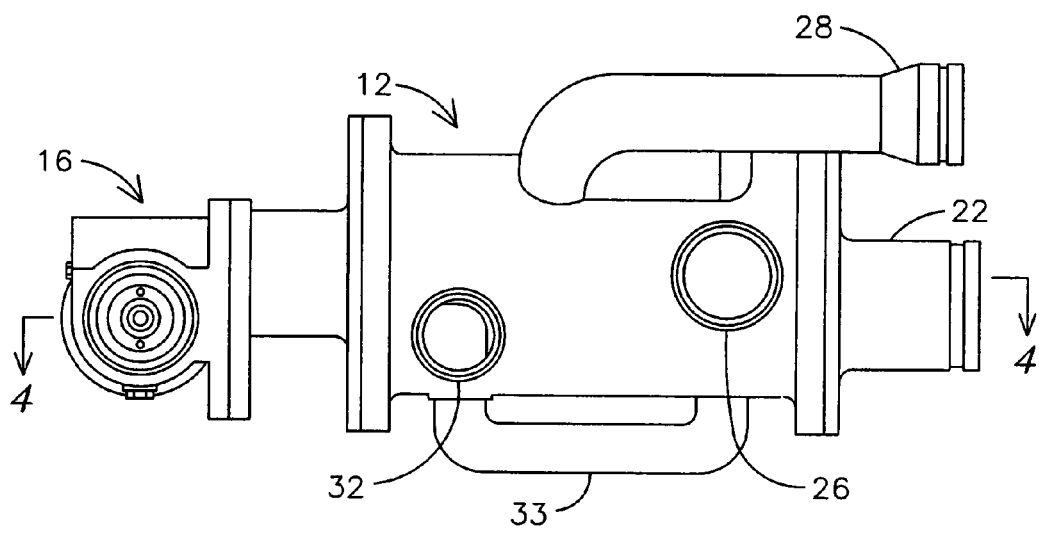
FIG. 2 is a side view of the valve of FIG. 1.
Figure 3:
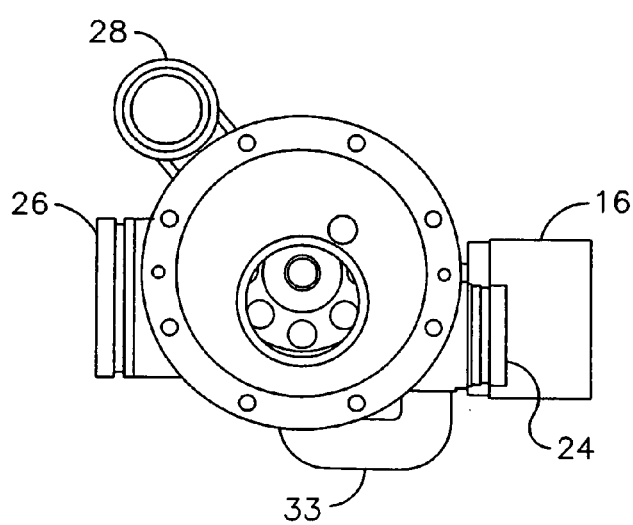
FIG. 3 is an end view of the valve of FIG. 1.

FIGS. 1–7 illustrate a ganged rotor valve 10 that may be used in a split cooling system of a turbocharged diesel-powered locomotive or off-road vehicle. The valve 10 includes a body 12 defining a cylindric valve chamber and having a plurality of openings formed therein, a ganged rotor 14, and an actuator 16. A longitudinally oriented shaft 13 interconnects the rotor 14 and actuator 16. The valve includes a cold water section 18 and a hot water section 20 including respective cold rotor section $14_C$ and hot rotor section $14_H$, together which form the ganged rotor 14. The shaft 13 extends through the cold water section $14_C$ and is supported at opposed ends of the cold water section $14_C$ by bearing assemblies 80. The shaft further extends to connect with the hot water section $14_C$ that is supported at the shaft end by a bearing assembly 80. Hot water from the diesel engine enters the hot water section 18 through hot water inlet 22 located along a longitudinal axis of the valve 10. The hot water is selectively directed by the hot section portion of the rotor to the radiator through the radiator outlet 24, to the water holding tank through tank hot water outlet 26, and to the intercooler through intercooler outlet 28. Cold water from a sub-cooler enters the cold water section 18 through cold water inlet 30. The cold water is selectively directed by the cold section portion of the rotor to the water holding tank through tank cold water outlet 32 and to the intercooler through intercooler outlet 28. Note that intercooler outlet 28 may receive water alternatively from two sources, but the hot water section 20 and the cold water section 18 are isolated from each other by divider plate 21 and shaft seal 23. A radiator drain line 33 is also provided to connect the radiator outlet 24 with the cold water section 18.

The locomotive split cooling system utilizing valve 10 may be operated in three modes. Mode 3 is utilized when the engine is first started and the engine and cooling fluids are being heated. In Mode 3, hot water from the engine entering the hot water inlet 22 is directed to the intercooler outlet 28 and to the tank hot water outlet 26 and it is prevented from exiting the radiator outlet 24. In this mode there is no water at all in the cold water section 18. Mode 2 is used when the engine is at full operating temperature and heat must be dumped to the radiator, while at the same time the intake combustion air must be heated due to cold atmospheric conditions. In Mode 2, a portion of the hot water is directed to the radiator through radiator outlet 24 while hot water continues to be directed to the intercooler, and no hot water is directed to the holding tank. The water flowing to the radiator returns to the valve through the cold water inlet 30 after being cooled by the radiator and sub-cooler. This cold water is directed to the water holding tank via the tank cold water outlet 32 but is prevented from entering the intercooler outlet 28. Mode 1 is the maximum cooling mode wherein all of the hot water is directed to the radiator through radiator outlet 24, and the cold water returning to the valve via the cold water inlet 30 is all directed to the intercooler outlet 28 to cool the intake combustion air.

In operating Mode 2, a seal on the hot section of rotor 14 that is positioned to close the tank hot water outlet 26 is exposed only to the internal pressure of the hot water within hot water section 20, since the water holding tank is maintained at essentially atmospheric pressure. When changing from Mode 2 to Mode 1, that same seal is rotated with the rotor 14 within the valve body 12 to a position that closes the hot section intercooler outlet 28, and wherein the seal must prevent mixing between the hot water in hot water section 20 (internal pressure) and the cold water in the intercooler outlet 28 (external pressure). Thus, in Mode 1 the seal is exposed to both internal and external pressure.

Figure 4:
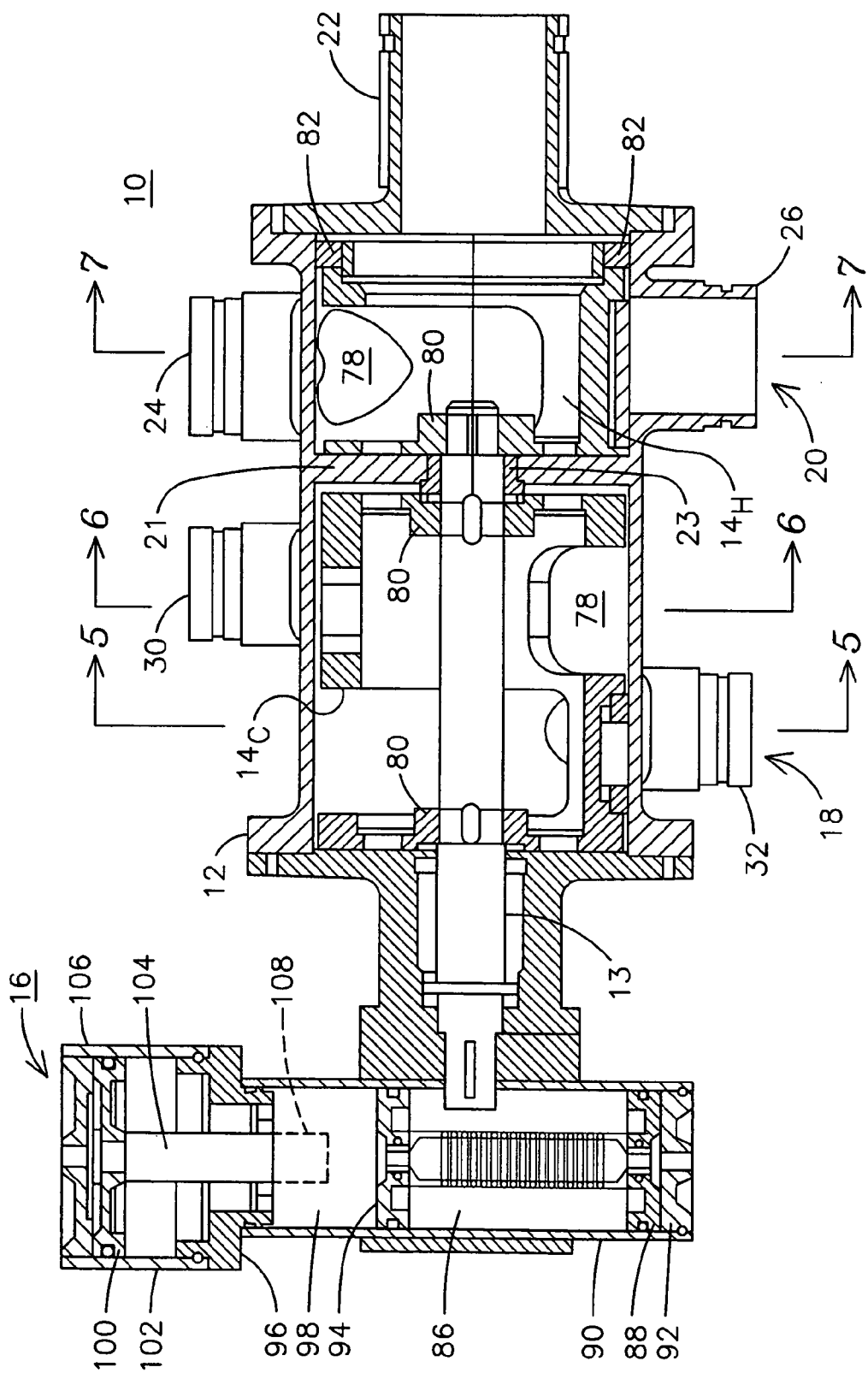
FIG. 4 is a cross-sectional view of the valve of FIG. 1 as seen along section 4—4 of FIG. 2.
Figure 5:
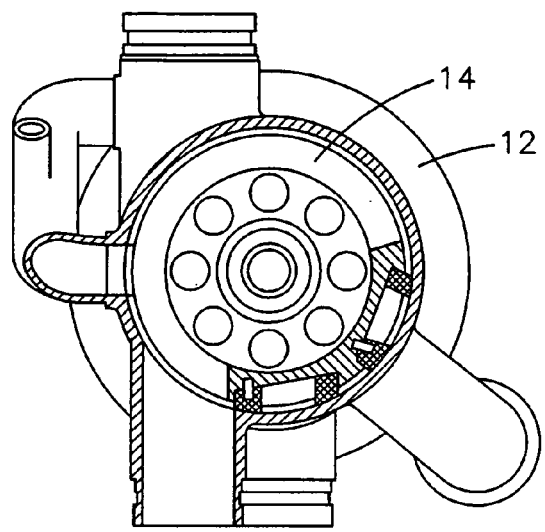
FIG. 5 is a cross-sectional view of the valve of FIG. 1 as seen along section 5—5 of FIG. 4.
Figure 6:
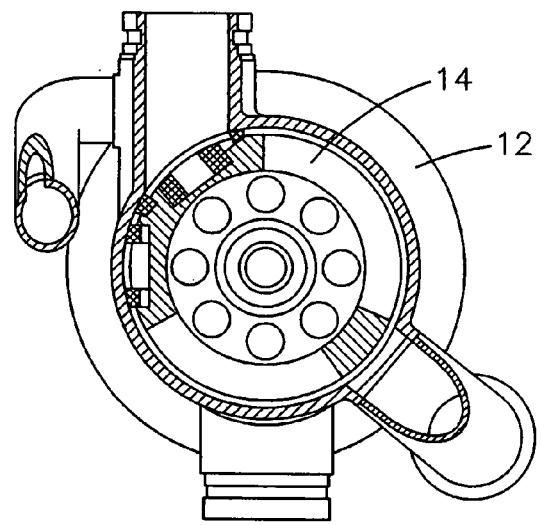
FIG. 6 is a cross-sectional view of the valve of FIG. 1 as seen along section 6—6 of FIG. 4.
Figure 7:
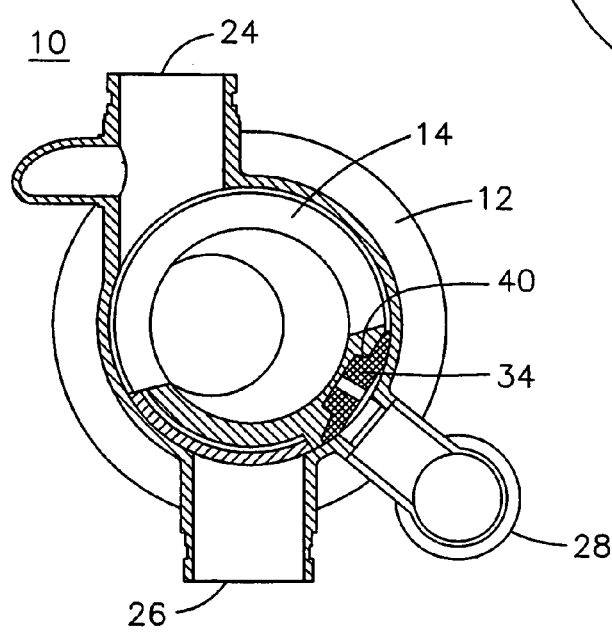
FIG. 7 is a cross-sectional view of the valve of FIG. 1 as seen along section 7—7 of FIG. 4.

FIGS. 5–7 are cross-sectional views of valve 10 taken along respective planes B—B, C—C, AND D—D as shown in FIG. 4. FIG. 7 shows the rotor 14 contained within bore of the valve body 12 in its Mode 1 position with a seal 34 in a position opposed the intercooler outlet 28.

Figure 8:
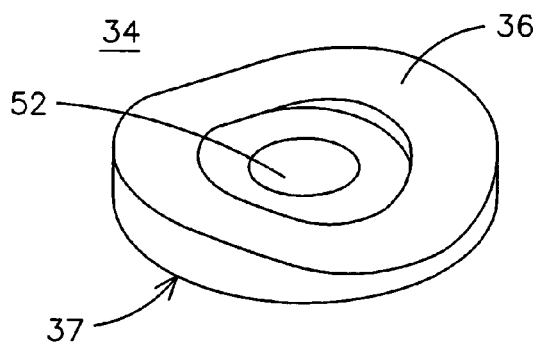
FIG. 8 is a perspective view of a seal used in the valve of FIG. 1.
Figure 9B:
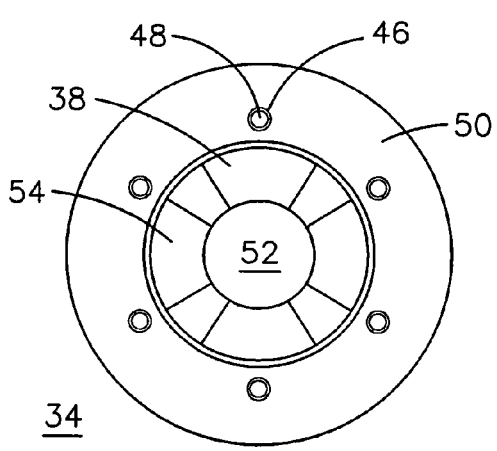
FIGS. 9A, 9B and 9C illustrate front, rear and side views respectively of the seal of FIG. 8.
Figure 9A:
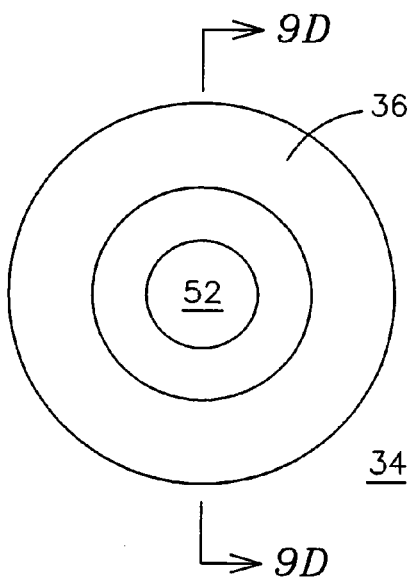
Figure 9C:
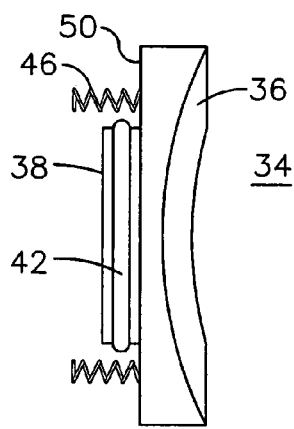
Figure 9D:
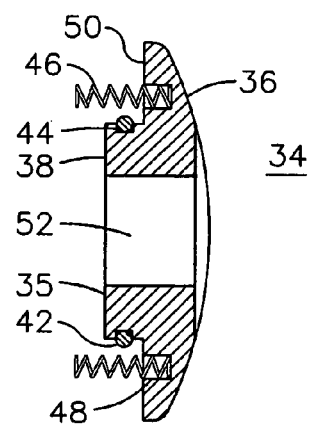
FIG. 9D is a cross-sectional view of the seal of FIG. 8 as seen along section 9D—9D of FIG. 9A.

Seal 34 is illustrated in more detail in FIGS. 8 and 9. FIG. 8 is a perspective view of seal 34 showing the sealing surface 36 that is urged against the interior wall of the valve body 12 surrounding a valve body opening to provide a drip-tight seal. FIG. 9 illustrates respective front, rear, side and cross-sectional views of the seal 34. Sealing surface 36 is formed on the body 37 of the seal to conform to the curvature of the interior wall of the valve body 12, and it slides along the interior wall surface as the rotor 14 is rotated from one position to another. Seal 34 has a generally circular outer circumference that is sized to surround a respective valve body opening. Opposed the sealing surface 36 is a centrally disposed projection 38 that is sized to fit within a mating bore 40 (as shown in FIG. 7) formed in the rotor 14. An O-ring 42 or other known type of sealing member is disposed within a groove 44 formed around the outside circumference of the projection 38 to provide a fluid seal between the seal 34 and the rotor 14. The dimensions of the projection 38, bore 40, O-ring 42 and groove 44 may be selected to provide tight contact between the seal 34 and the rotor 14 without any effect on the amount of force required to rotate the rotor 14. The same can not be said for the contact between the sealing surface 36 and the inside surface 39 of the valve body 12, since the force exerted between these two surfaces directly affects the amount of force needed to rotate the rotor 14.

Figure 10:
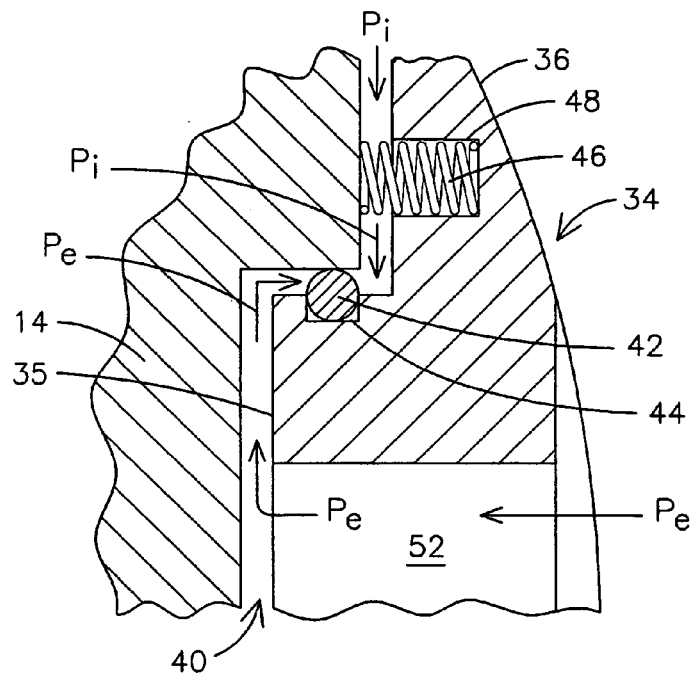
FIG. 10 is an expanded cross-sectional view of the interface between the valve body and the seal of the valve of FIG. 1 illustrating the areas of the seal exposed to internal pressure and to external pressure.

Seal 34 includes a plurality of springs 46 disposed in respective recesses such as flat-bottom holes 48 formed in the rear face 50 of projection 38. Springs 46 provide a force $F_S$ reacting against the rotor 14 to urge the sealing surface 36 against the inside surface of the valve body 12. While small coil springs retained in holes are illustrated herein, one may appreciate that other types of spring members may be used, such as a solid elastomer retained in holes or in the shape of a washer, a metallic spring washer, cantilevered leaf or bar springs, a spring memory shape of the material forming the sealing surface 36, etc. In addition to the force $F_S$, there is a force $F_H$ acting in the same direction that is created by the internal pressure $P_i$ of the hot water inside the hot water section 20 acting against the rear face 50. Because of the synergy of these two forces, the force that must be provided by springs 46 is minimized. Springs 46 function to maintain the sealing surface 36 in position against the body 12 so that the seal 34 can withstand a sudden increase in the pressure of the hot water when the diesel engine is started. As the pressure of the fluid increases, the sealing force ($F_S+F_H$) increases. When the seal 34 is positioned to close the tank hot water outlet 26, forces $F_S$ and $F_H$ are the only forces affecting the sealing surface 36. However, in operating Mode 1 when the seal 34 is positioned to isolate the intercooler outlet 28 from the hot water section 20, there is a third force $F_C$ acting in the opposite direction that is created by the external pressure $P_e$ of the cold water within the intercooler outlet 28 acting against the area of the sealing surface 36. The combination of forces $F_S+F_H$ is maintained sufficiently greater than $F_C$ in order to provide a leak-tight fluid seal. A passageway such as a centrally disposed opening 52 and a plurality of recessed areas or grooves 54 allows the pressure of the cold water to extend around the rear side of the seal 34 to O-ring 42, thereby allowing pressure $P_e$ to act on a portion of the rear surface area 35 of the seal 34 and reducing the net magnitude of force $F_C$. FIG. 10 is an expanded view of the area of interface between the seal 34 and the rotor 14 showing those areas of the seal 34 that are exposed to the internal pressure $P_i$ and to the external pressure $P_e$. Note that the opening 52 provides a passageway through the seal body 37 from the sealing surface 36 to the seal backside (rear) surface 35 for directing the external pressure $P_e$ existing within the valve body opening that is being sealed to the rear surface 35. That pressure is exerted on only the portion of the rear surface 35 bounded by the location of the O-ring seal 42. The location of the O-ring seal 42 along the rear surface 35 of the seal 34 is a matter of design choice. In the embodiment of FIG. 10, the spring 46 is located radially outwardly from the O-ring seal 42. The O-ring seal 42 provides a fluid seal between the wall of the rearward projection portion 38 of the seal and the wall of the bore 40 in the rotor 14. The pressure boundary thus consists of the rotor 14, the O-ring 42, the seal 34, and the interface between the sealing surface 36 and the opposed inside surface of the valve body 12 (not shown in FIG. 10). This pressure boundary prevents the hot water at pressure $P_e$ from mixing with the cold water at pressure $P_i$ across the sealing surface 36 or between the seal 34 and the rotor 14.

In one embodiment of valve 10, the seal 34 is formed of 25% glass impregnated Teflon® polytetrafluoroethylene (PTFE) except for the springs 46, which may be a stainless steel.

Figure 11A:
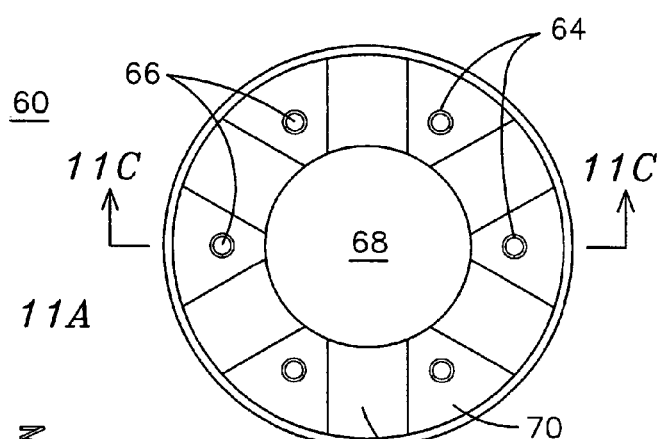
FIGS. 11A and 11B illustrate rear and side views respectively of a further embodiment of a seal for a rotor valve.
Figure 11B:
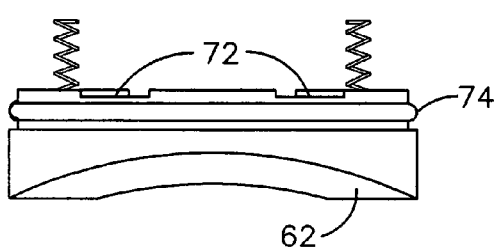
Figure 11C:
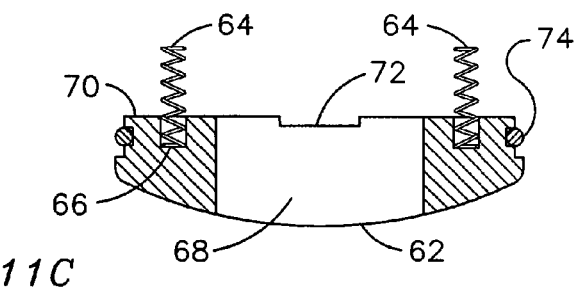
FIG. 11C is a cross-sectional view of the seal of FIG. 11A as seen along section 11C—11C.
Figure 13:
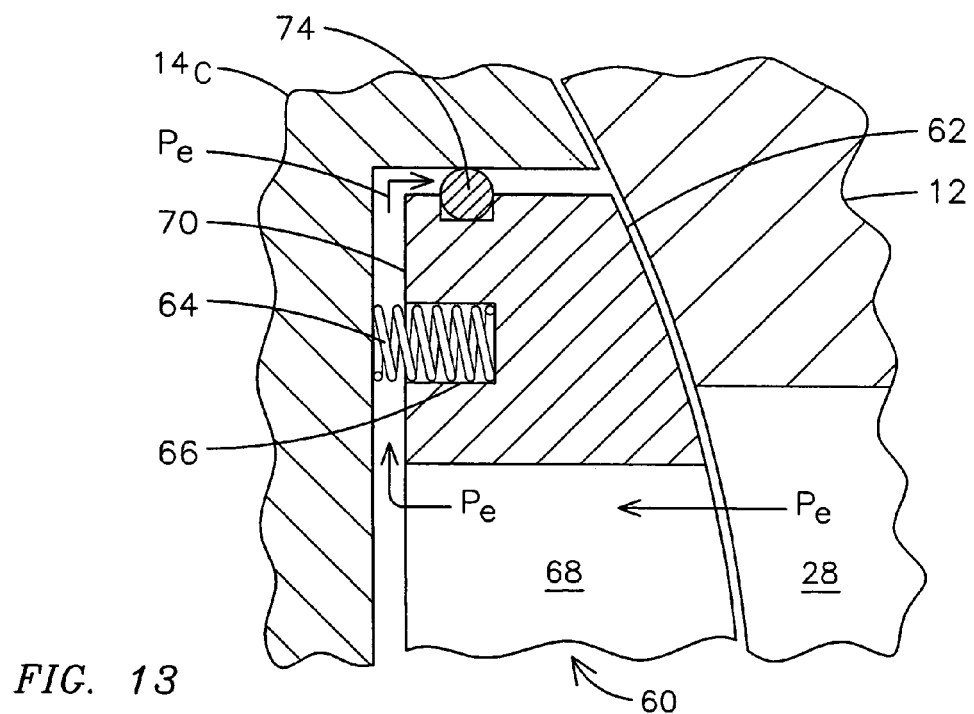
FIG. 13 is an expanded cross-sectional view of the interface between the valve body and seal of FIG. 11 illustrating the areas of the seal exposed to external pressure.

One may appreciate that for various operating conditions involving various interior and exterior fluid pressures, respective geometric configurations of the above-described parts may be selected to provide an optimal balance of forces to ensure that a leak-tight seal is maintained without creating the need for an excessive force to rotate the rotor 14. To illustrate this point, consider a further embodiment of a seal 60 for valve 10 as shown in FIG. 11. This seal 60 may be used for the cold water section 18 in an application where the seal 60 is exposed to external pressure $P_e$ only. Such a condition may exist in a locomotive application during operating Mode 3 when the radiator is drained and thus there is no fluid within the valve cold water section 18, and the seal 60 must resist the intrusion of hot water from the intercooler outlet 28 into the cold water section 18. Seal 60 includes a sealing surface 62 for sealing contact against an interior surface of valve body 12. (see expanded view in FIG. 13) Springs 64 disposed within flat-bottomed holes 66 react against the rotor $14_C$ to provide a spring sealing force $F_S$ against the sealing surface 62. In the absence of cold-water interior pressure $P_i$, the spring force $F_S$ need only overcome the hot water force $F_H$ caused by the external pressure $P_e$ acting on the sealing surface 62. In order to minimize the size and numbers of springs necessary to achieve the desired seal, an opening 68 is provided at the center of the seal 60 to allow the external pressure $P_e$ to migrate around the seal 60 to act upon the rear face 70. A plurality of grooves 72 may be formed along the rear face 70 to facilitate the passage of external pressure $P_e$ along the rear of the seal 60 to the location of a flexible seal such as O-ring 74. In this embodiment, springs 64 are disposed within the area defined by O-ring seal 74. Springs 64 also provide a biasing force to maintain the sealing surface 62 in contact with the valve body 12 so that the seal 60 can be effective against a sudden increase in the hot water force $F_H$. As the external pressure $P_e$ increases, the counterbalancing backside force also increases, thus maintaining a leak-tight seal without the need to increase the spring force $F_S$ as the external hot water pressure rises. One skilled in the art will recognize that the springs 46 and 64 of FIGS. 10 and 13 are optional and the seals 34, 60 may be designed to rely solely upon the pressure-activated sealing forces.

Figure 12:
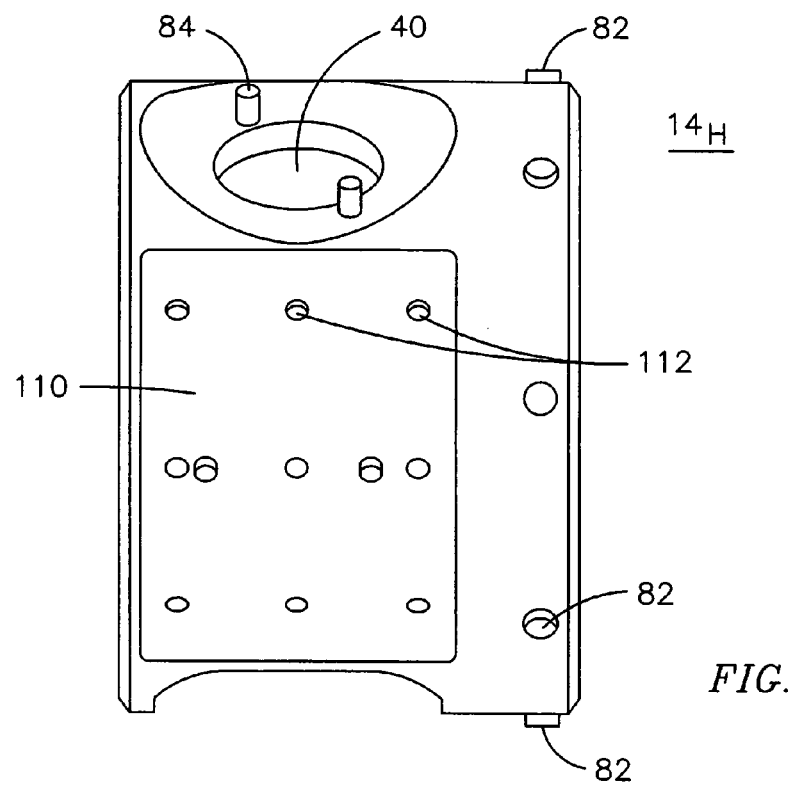
FIG. 12 is a side view of the rotor section from the hot water section of the valve of FIG. 1.

FIG. 4 illustrates ganged rotor 14 as being formed of two portions: cold rotor section $14_C$ and hot rotor section $14_H$. Each portion includes a cylindrical shaped body 83 rotatable about a longitudinal axis and including a passageway 78 for directing fluid between selected openings in the valve body 12. Cold rotor section $14_C$ is supported at both longitudinal ends by shaft bearing assemblies 80, such as roller bearings, ball bearings or other such bearings known in the art. Hot rotor section $14_H$, however, is of a cantilever design and is supported at only one longitudinal end by a bearing assembly 80. This allows the rotor to include a water inlet opening 81 to be formed in the rotor body 83 along one end of its rotational axis for receiving water from hot water inlet 22. The rotor sections are sized to allow a sufficient space (such as 0.125 inch) between the valve body interior wall and the rotor to avoid becoming clogged with dirt or debris suspended in the water. In order to provide additional support for centering hot rotor section $14_H$ within the cavity of hot water section 20, while at the same time minimizing the amount of rotational friction resistance created by such centering support, the hot rotor section $14_H$ is provided with a plurality of low-friction slip-surface plugs 82 that extend radially beyond the diameter of the rotor for making sliding contact with the interior surface of the valve body 12. These plugs 82 may be seen more clearly in FIG. 12, which is a side view of hot rotor section $14_H$. The plugs 82 are disposed about a circumference of the rotor $14_H$ at the end opposed the end supported by shaft 13. In this embodiment there are eight plugs 82 disposed evenly around the circumference of the rotor 14. The plugs may be formed of PTFE or other low friction material. Also visible in FIG. 12 is the bore 40 for receiving seal 34 (not installed in FIG. 12). In this embodiment, two studs 84 are provided for positioning and supporting seal 34. The diameter of hot rotor section 14H is less than the inside diameter of the bore of the valve body 12 to provide an annular gap for allowing water to flow around the rotor 14 to provide a cleaning action. A typical annular gap width for a locomotive application may be approximately 0.125 inch. The plugs 82 may be formed of Teflon® material or other material having a low coefficient of friction, and the mating surface of the valve body 12 may be hard chrome plated with a Rockwell C value of 60–70 and a surface finish of approximately 8 in order to minimize the friction there between.

Figure 14:
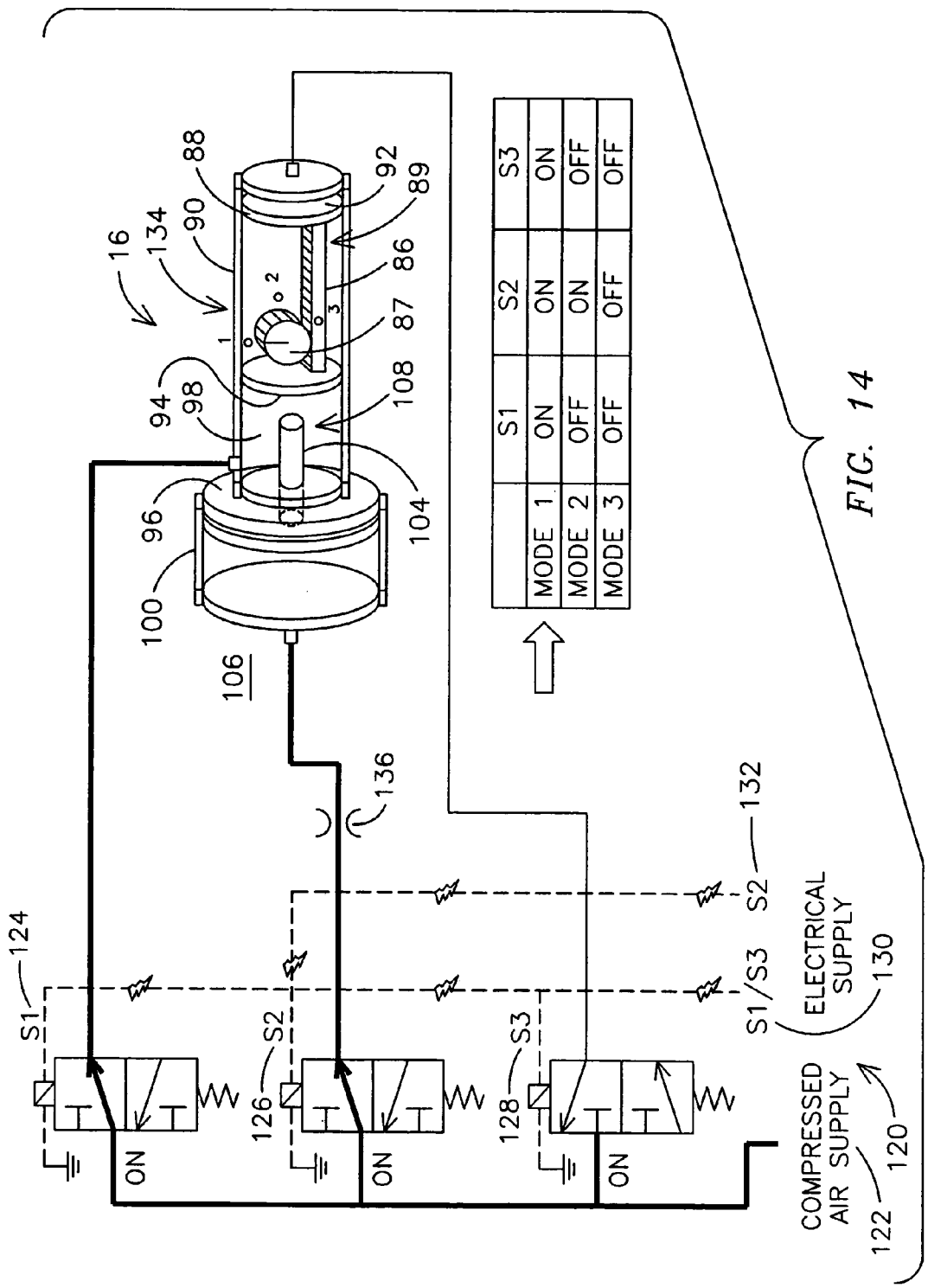
FIG. 14 is a schematic illustration of the air-powered control system used to position the actuator for the valve of FIG. 1 in a Mode 1 position.

Actuator 16 provides motive force for rotating shaft 13 to any of three angular positions. Shaft 13 is connected to a rack 86 (as shown in FIG. 4) by a pinion gear 87 (as shown in FIG. 14). The rack 86 is connected to a piston 88 disposed within a cylinder 90. Together, the rack 86 and piston 88 comprise one embodiment of a carriage 89, and one skilled in the art may envision other carriage assemblies for interconnecting the pinion gear 87 with a pressure-containing cylinder 90. The piston 88 is illustrated in FIG. 4 in a bottommost position within the cylinder 90, i.e. Mode 1 in a locomotive embodiment. The terms "bottommost", "upward" and "downward" are used herein to represent relative positions as illustrated in FIG. 4, although in a real-world embodiment the actuator may be oriented in other positions. A pressurized working fluid such as pressurized air introduced into a bottom cylinder chamber 92 will drive the piston 88 upward until the top surface 94 of the piston 88 makes contact with a stationary stop 96. The linear movement of the piston 88 within cylinder 90 transports rack 86, thereby rotating shaft 13. When the air pressure is released from bottom cylinder chamber 92 and applied in middle cylinder chamber 98, the piston 88 and shaft 13 will return to their original positions.

A third, intermediate position of piston 88 and shaft 13 is achieved by providing a second piston 100 within an upper cylinder 102. The second piston 100 is connected to a moveable stop 104 that is withdrawn from cylinder 90 when the second piston 100 is in its uppermost position, as illustrated in FIG. 4. When pressurized air is applied to the upper cylinder chamber 106, second piston 100 will move downward to extend moveable stop 104 into middle cylinder chamber 98 to a position indicated by the dashed lines 108. The downward movement of piston 100 is stopped by the upper surface of stationary stop 96. In this position, the range of upward movement of bottommost piston 88 will be restricted by contact with moveable stop 104 at a third intermediate position when air pressure is applied to bottom cylinder chamber 92. If a single source of compressed fluid is used for each of the three cylinder chambers, it is necessary for the surface area of second piston 100 to be greater than the surface area of bottommost piston 88 so that the upward force exerted by bottommost piston 88 is not sufficient to displace moveable stop 104 from its bottommost position 108. In one embodiment, the diameter of second piston 100 is at least 1.4 times that of bottommost piston 88. The pistons may be sealed against their respective cylinders 90, 102 by O-ring seals, and the cylinder walls may have a Rockwell C hardness of 60 to 70 and a surface finish of 8 or less to ensure low friction operation.

FIG. 12 also illustrates a generally rectangular recess 110 formed in rotor $14_H$ that is shaped to receive a generally rectangular seal member (not shown). The rectangular seal in the illustrated application is designed to seal against only internal pressure. The design of such a seal may be similar to seal 60, including springs (not shown) that seat against blind holes for urging the seal against the valve body 12. The seal has a rectangular shape so that the surface area covered by the seal has an extended circumferential length when compared to a circular shape. This shape can be used when there would be insufficient circumferential room to position two circular seals side-by-side. FIG. 12 shows that the hot rotor section $14_H$ is designed to carry two seals for selectively sealing or opening the valve hot-side openings for the radiator outlet 24, tank hot water outlet 26 and intercooler outlet 28. The following chart indicates the opening number that is closed by each of the two hot-side seals in the three operating modes of a locomotive. An "X" indicates that the seal does not close any opening in that particular mode.

|  | Mode 1 | Mode 2 | Mode 3 |
|---|---|---|---|
| rectangular seal | 26 | X | 24 |
| circular seal 34 | 28 | 26 | X |
|  | (24 open) | (24, 28 open) | (26, 28 open) |

A similar chart is also provided below for the cold water section 18, wherein openings for the intercooler outlet 28, cold water inlet 30, tank cold water outlet 32, and radiator drain line 33 are selectively closed. To perform these functions, four seals are provided around the circumference of the cold rotor section $14_C$, designated as seals A, B, C and D in the following chart. Seals A–C may have the design illustrated for seal 60 of FIG. 11, with seal C being somewhat smaller since it must accommodate only the relatively smaller size of radiator drain line 33 opening. Seal D may have the design illustrated for seal 34 of FIG. 9.

|  | Mode 1 | Mode 2 | Mode 3 |
|---|---|---|---|
| Seal 2A | X | 28 | X |
| Seal 3B | X | X | 28 |
| Seal 1C | 33 | X | X |
| Seal 4D | 32 | 33 | X |

Figure 15:
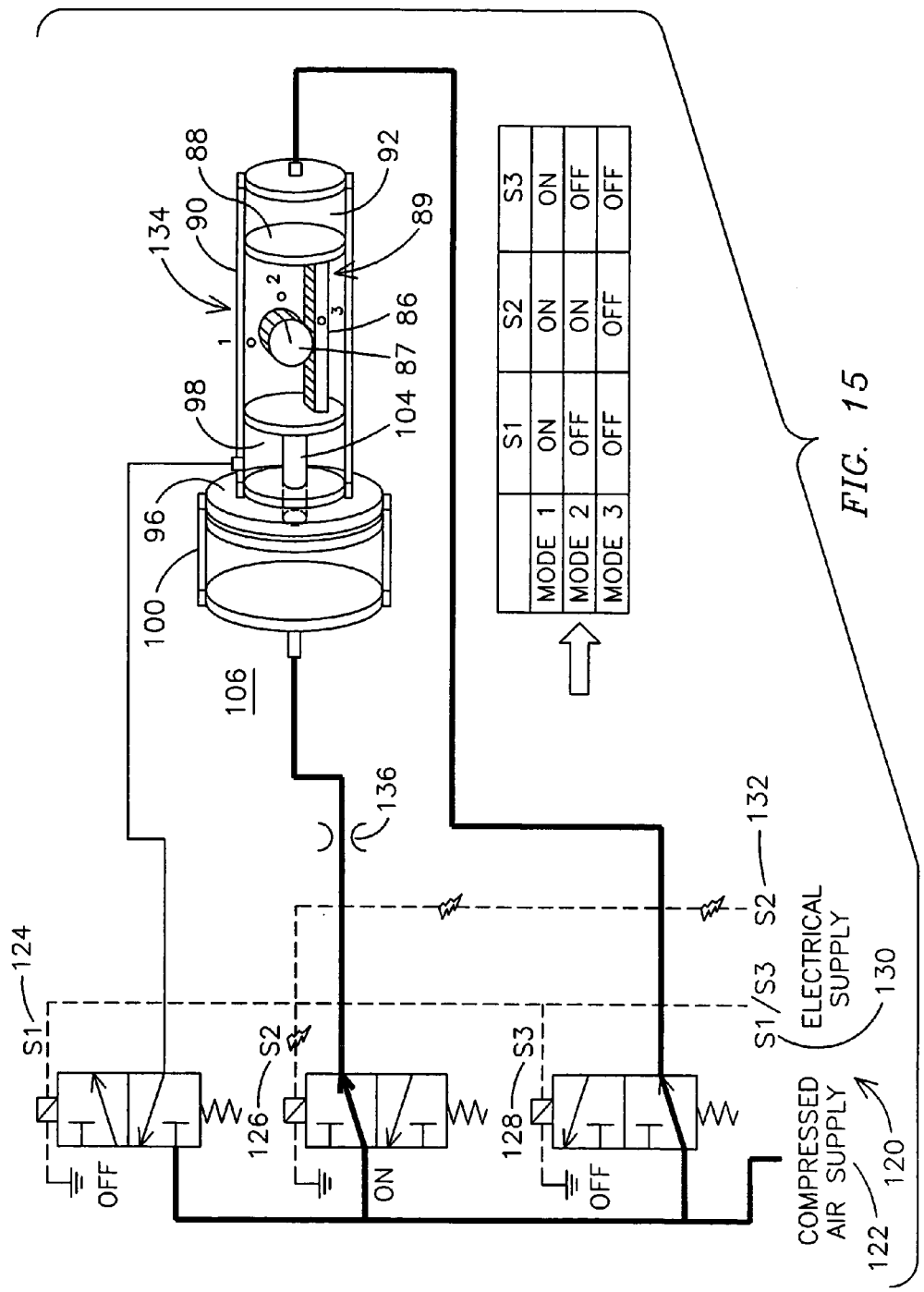
FIG. 15 is a schematic illustration of the air-powered control system used to position the actuator for the valve of FIG. 1 in a Mode 2 position.
Figure 16:
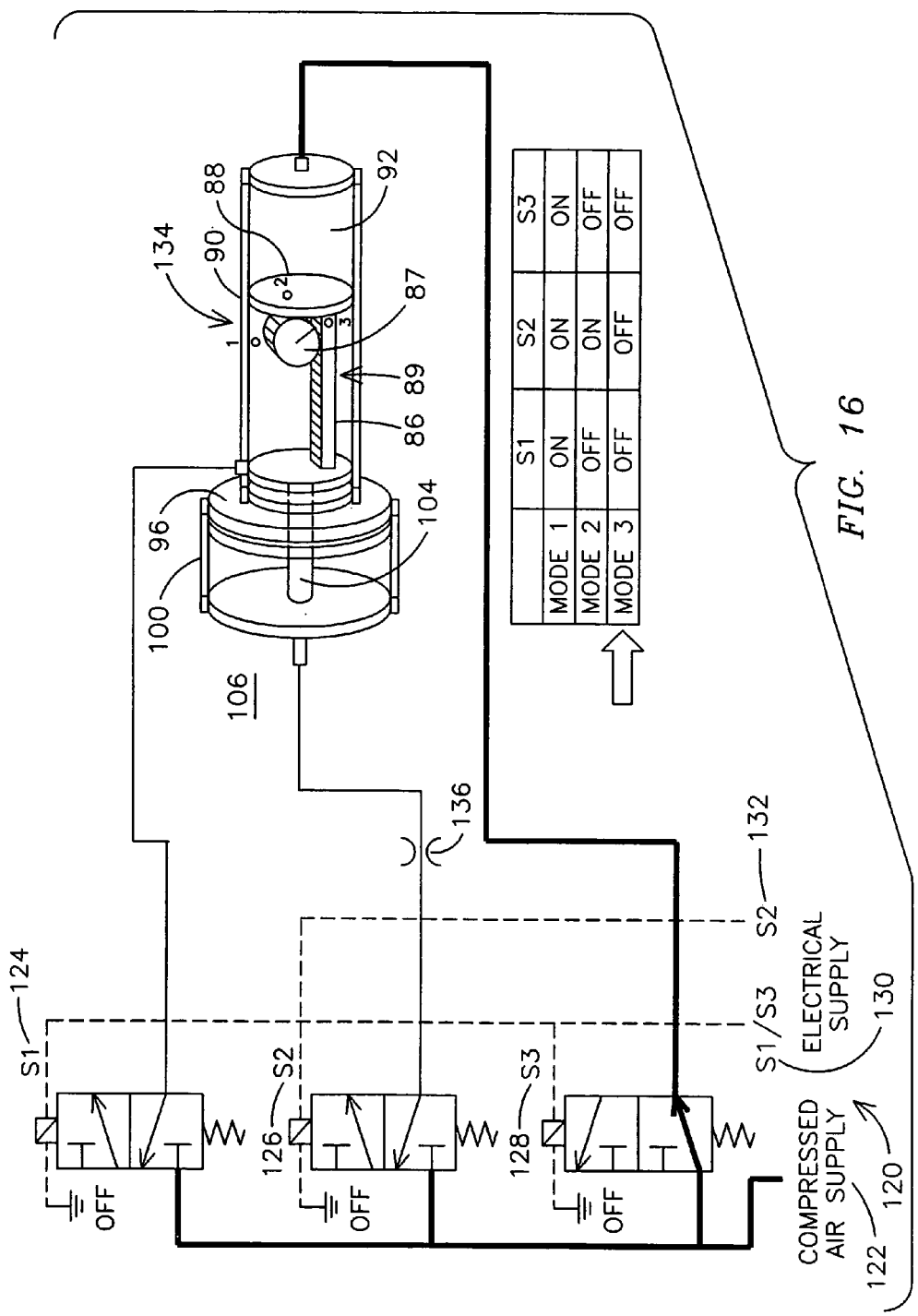
FIG. 16 is a schematic illustration of the air-powered control system used to position the actuator for the valve of FIG. 1 in a Mode 3 position.

FIGS. 14–16 illustrate an air-powered control system 120 that may be used to control the position of actuator 16 in the three Modes of operation. A single compressed air supply 122 is used to provide compressed air to three solenoid valves S1, S2, S3, also designated by numerals 124, 126 and 128. The electrical supply 130 is used to power both solenoid valves 124 and 126 in parallel, while electrical supply 132 is used to power solenoid valve 128, thereby allowing all three solenoids to be operated with two drivers. Solenoids 124, 126 are normally closed, while solenoid 128 is normally open. As seen in FIG. 14, Mode 1 operation is achieved by providing power to all three solenoid valves via electrical supplies 130 and 132. This allows compressed air to enter middle cylinder chamber 98 and upper cylinder chamber 106, driving piston 88 to its bottommost position. In Mode 2, as illustrated in FIG. 15, only electrical supply 132 is energized, thereby permitting compressed air to enter upper cylinder chamber 106 and bottom cylinder chamber 92. In this mode, cylinder 88 is driven against moveable stop 104 that is being held in its bottommost position 108, thereby achieving a middle position for cylinder 88 and attached rack 86. Note that the difference in cross-sectional area of cylinders 88 and 100 ensures that cylinder 100 is held against stationary stop 96 in spite of the force exerted by cylinder 88 on moveable stop 104. In Mode 3, as shown in FIG. 16, both of the electrical supplies 130 and 132 are de-energized, thereby providing compressed air only to bottom cylinder chamber 92 and driving cylinder 88 to its topmost position. A position indicator 134 may be provided to show the position of the valve. Position indicator 134 is illustrated as a rack and pinion device extending through the valve chamber wall, however, any other type of known valve position indicator may be used for local or remote valve position indication. An anti-snap orifice 136 may be provided to ensure smooth operation of the valve piston(s).

While the preferred embodiments of the present invention have been shown and described herein, it will be obvious that such embodiments are provided by way of example only. Numerous variations, changes and substitutions will occur to those of skill in the art without departing from the invention herein.

The invention claimed:

1. An actuator operated by fluid under pressure for selectively positioning a rotor of a rotary valve in any one of at least three positions, the actuator comprising:
   a carriage adapted for connection to a rotor of a rotary valve, the carriage comprising a first piston disposed in a first cylinder for providing a range of motion to rotate the rotor between a first position and a second position in response to fluid pressure within the first cylinder, wherein the first piston comprises opposed surfaces exposed to respective fluid pressures in a first portion and a second portion of the first cylinder to move the first piston respectively toward the first position and toward the second position; and
   a stop selectively moveable from a withdrawn position to an extended position to restrict the range of motion of the carriage when the stop is in its extended position to provide a third position of the rotor intermediate the first position and the second position, wherein the stop is connected to a second piston disposed within a second cylinder to move the stop in response to fluid pressure within the second cylinder;
   a compressed air supply;
   a normally open solenoid valve connected between the compressed air supply and the first portion of the first cylinder;
   a first normally closed solenoid valve connected between the compressed air supply and the second portion of the first cylinder;
   a second normally closed solenoid valve connected between the compressed air supply and the second cylinder;
   a first electrical supply connected to both the normally open solenoid valve and the first normally closed solenoid valve; and
   a second electrical supply connected to the second normally closed solenoid valve.

2. The actuator of claim 1,
   wherein
   a surface area of the second piston is greater than a surface area of the first piston so that a force exerted by the first piston is not sufficient to displace the stop from its extended position when the fluid under pressure is present in both the first cylinder and the second cylinder.

3. The actuator of claim 1, wherein the surface area of the second piston is at least 1.4 times the surface area of the first piston.

4. A rotor valve comprising a body defining a cylindrical valve chamber; a plurality openings formed in the body; a rotor disposed within the chamber and rotatable for selective opening and closing of the openings; and the actuator of claim 1 engaged with the rotor for moving the rotor among first, second and third positions.

5. A rotor valve actuator comprising:

a rack adapted for driving a pinion gear of a rotor valve;

a first piston associated with the rack and responsive to fluid pressure within a first-piston cylinder to move the rack between first and second positions;

a movable stop;

a second piston associated with the moveable stop and responsive to fluid pressure within a second-piston cylinder to move the stop from a withdrawn position where it does not interfere with a range of motion of the rack to an extended position where it does interfere with a range of motion of the rack to limit movement of the rack in one direction to a third position intermediate the first and second positions when the stop is in the extended position;

wherein the first piston comprises opposed surfaces exposed to respective fluid pressures in a first portion and a second portion of the first-piston cylinder to move the first piston respectively toward the first position and toward the second position;

further comprising:

a compressed air supply;

a normally open solenoid valve connected between the compressed air supply and the first portion of the first-piston cylinder;

a first normally closed solenoid valve connected between the compressed air supply and the second portion of the first-piston cylinder;

a second normally closed solenoid valve connected between the compressed air supply and the second-piston cylinder;

a first electrical supply connected to both the normally open solenoid valve and the first normally closed solenoid valve; and a second electrical supply connected to the second normally closed solenoid valve.

6. The rotor valve actuator of claim 5, wherein the stop comprises a member extending into the first-piston cylinder to interfere with a range of motion of the first piston when the stop is in the extended position.

7. The rotor valve actuator of claim 5, further comprising:

a common supply of fluid under pressure selectively providing fluid under pressure to each of the first-piston cylinder and the second-piston cylinder; and wherein a surface area of the second piston is greater than a surface area of the first piston so that a force exerted by the first piston is not sufficient to displace the stop from its extended position when the fluid under pressure is present in both the first-piston cylinder and the second-piston cylinder.

8. The actuator of claim 7, wherein the surface area of the second piston is at least 1.4 times the surface area of the first piston.

9. A rotor valve comprising a body defining a cylindrical valve chamber; a plurality openings formed in the body; a rotor disposed within the chamber and rotatable for selective opening and closing of the openings; a pinion gear connected to the rotor; and the rack of the actuator of claim 5 engaged with the pinion gear for moving the rotor among first, second and third positions.

* * * * *